(12) United States Patent
Yang

(10) Patent No.: US 7,436,475 B2
(45) Date of Patent: Oct. 14, 2008

(54) TRANSFLECTIVE LIQUID CRYSTAL DISPLAY APPARATUS, LIQUID CRYSTAL DISPLAY PANEL AND FABRICATING METHOD THEREOF

(75) Inventor: Yung-Shun Yang, Tainan County (TW)

(73) Assignee: Chi Mei Optoelectronics Corp., Tainan County (TW)

( * ) Notice: Subject to any disclaimer, the term of this patent is extended or adjusted under 35 U.S.C. 154(b) by 239 days.

(21) Appl. No.: 11/463,912

(22) Filed: Aug. 11, 2006

(65) Prior Publication Data

US 2007/0035684 A1 Feb. 15, 2007

(30) Foreign Application Priority Data

Aug. 11, 2005 (TW) ............................... 94127267 A

(51) Int. Cl.
*G02F 1/1335* (2006.01)
(52) U.S. Cl. ........................................ 349/114; 349/113
(58) Field of Classification Search .......... 349/113–141
See application file for complete search history.

(56) References Cited

U.S. PATENT DOCUMENTS 6,654,076 B2 * 11/2003 Ha et al. ....................... 349/43

OTHER PUBLICATIONS

Yang et al., "Application of Micro-tube Array in Transflective LCDs for Transmissive Light Efficiency Enhancement," 03-014, Institute of Electro-Optical Engineering, National Chiao-Tung University, Hsinchu, TW/AU Optronics Corporation, Hsinchu, TW, 2004, pp. 233-236.

Shieh et al., "Micro-optics Components for Liquid Crystal Displays Applications," *IMID '04 Digest*, Institute of Electro-Optical Engineering, National Chiao Tung University, Hsinchu, TW, 2004, pp. 1-4.

* cited by examiner

*Primary Examiner*—David C. Nelms
*Assistant Examiner*—Phu Vu

(57) ABSTRACT

A transflective liquid crystal display (LCD) panel includes a first substrate and a second substrate. The second substrate has a common electrode layer facing the first substrate. The first substrate has a plurality of pixel units. Each of the pixel units has a plurality of protrusions, a first reflective layer, a bumping layer, a second reflective layer, and a transparent conductive layer. Each of the protrusions has a through hole exposing a portion of the first substrate. The first reflective layer is disposed on the protrusions but not on the exposed portions of the first substrate. The bumping layer is disposed on the first reflective layer and the second reflective layer is disposed on the bumping layer. The transparent conductive layer covers the portions of the first substrate exposed by the through holes.

27 Claims, 3 Drawing Sheets

US 7,436,475 B2

TRANSFLECTIVE LIQUID CRYSTAL DISPLAY APPARATUS, LIQUID CRYSTAL DISPLAY PANEL AND FABRICATING METHOD THEREOF

RELATED APPLICATIONS

This application claims priority from Taiwanese Application No. 094127267 filed Aug. 11, 2005 which is incorporated by reference herein in its entirety.

BACKGROUND

1. Technical Field

The present invention relates to a liquid crystal display panel. More particularly, the present invention relates to a transflective liquid crystal display (LCD) apparatus, a transflective liquid crystal display panel, and a fabricating method thereof.

2. Related Art

Many portable electronic products, such as mobile phones, personal digital assistants (PDA), or pocket PCs, now have increasing requirements for the display function, quality or performance of their display screens which are LCDs. For example, the portable electronic products are required to maintain an appropriate picture quality in both indoor and bright outdoor environments. Therefore, how to maintain a desired picture quality of an LCD in a brightly lit environment has become an important trend in developing the LCD technology. A transflective LCD has been known in the conventional art as being able to provide adequate display effect, quality and performance both indoors and in a bright outdoor environment.

In the conventional transflective LCD panel, the light emitted by a backlight source is generally blocked by a reflective region and cannot be utilized for displaying images. As such, the brightness of the conventional transflective LCD panel is limited by the area of the reflective region.

Thus, there is a need for a liquid crystal display panel and a transflective liquid crystal display apparatus that can utilize at least a portion of the light blocked by the reflective region to enhance the display quality and performance in the bright outdoor environment.

SUMMARY

In an aspect, a transflective LCD panel comprises a first substrate and a second substrate facing the first substrate. The first substrate has a plurality of pixel units. Each of the pixel units has a plurality of protrusions, a first reflective layer, a bumping layer, a second reflective layer, and a transparent conductive layer. Each of the protrusions has a through hole exposing a portion of the first substrate. The first reflective layer is disposed on outer walls of the protrusions but not on the exposed portions of the first substrate. The bumping layer is disposed on the first reflective layer and the second reflective layer is disposed on the bumping layer. The transparent conductive layer covers the portions of the first substrate exposed by the through holes.

In a further aspect, a method of fabricating a transflective LCD panel uses a first substrate, which has a plurality of scan lines, a plurality of data lines, and a plurality of active devices already formed thereon, wherein each of the active devices is electrically connected to the corresponding scan line and the data line. In the method, a plurality of protrusions are formed on the first substrate, wherein each of the protrusions has a through hole exposing a portion of the first substrate. A first reflective layer is formed on the first substrate. A bumping layer is formed on the first reflective layer. A second reflective layer is formed on the bumping layer. The second reflective layer, the bumping layer, and the first reflective layer are partially selectively removed, so as to expose the portions of the first substrate exposed by the through holes. A transparent conductive layer is formed on the first substrate.

According to an embodiment, a second substrate which has a common electrode layer are assembled with the first substrate, wherein the common electrode layer of the second substrate faces the pixel units of the first substrate.

In a further aspect, a transflective LCD apparatus comprises a first substrate, a second substrate, and a liquid crystal layer. The liquid crystal layer is disposed between the first substrate and the second substrate. The second substrate has a common electrode layer facing the first substrate. The first substrate has a plurality of pixel units. Each of the pixel units comprises a plurality of protrusions, a first reflective layer, a bumping layer, a second reflective layer, and a transparent conductive layer. Each of the protrusions has a through hole exposing a portion of the first substrate. The first reflective layer is disposed on outer walls the protrusions but not on the exposed portions of the first substrate. The bumping layer is disposed on the first reflective layer, and the second reflective layer is disposed on the bumping layer. The transparent conductive layer covers the portions of the first substrate exposed by the through holes.

In a further aspect, a portable electronic device comprises a display screen being the transflective LCD apparatus disclosed immediately above.

Additional aspects and advantages of the disclosed embodiments are set forth in part in the description which follows, and in part are obvious from the description, or may be learned by practice of the disclosed embodiments. The aspects and advantages of the disclosed embodiments may also be realized and attained by the means of the instrumentalities and combinations particularly pointed out in the appended claims.

BRIEF DESCRIPTION OF THE DRAWINGS

The disclosed embodiments are illustrated by way of example, and not by limitation, in the figures of the accompanying drawings, wherein elements having the same reference numeral designations represent like elements throughout.

DETAILED DESCRIPTION OF EMBODIMENTS

Figure 1A:
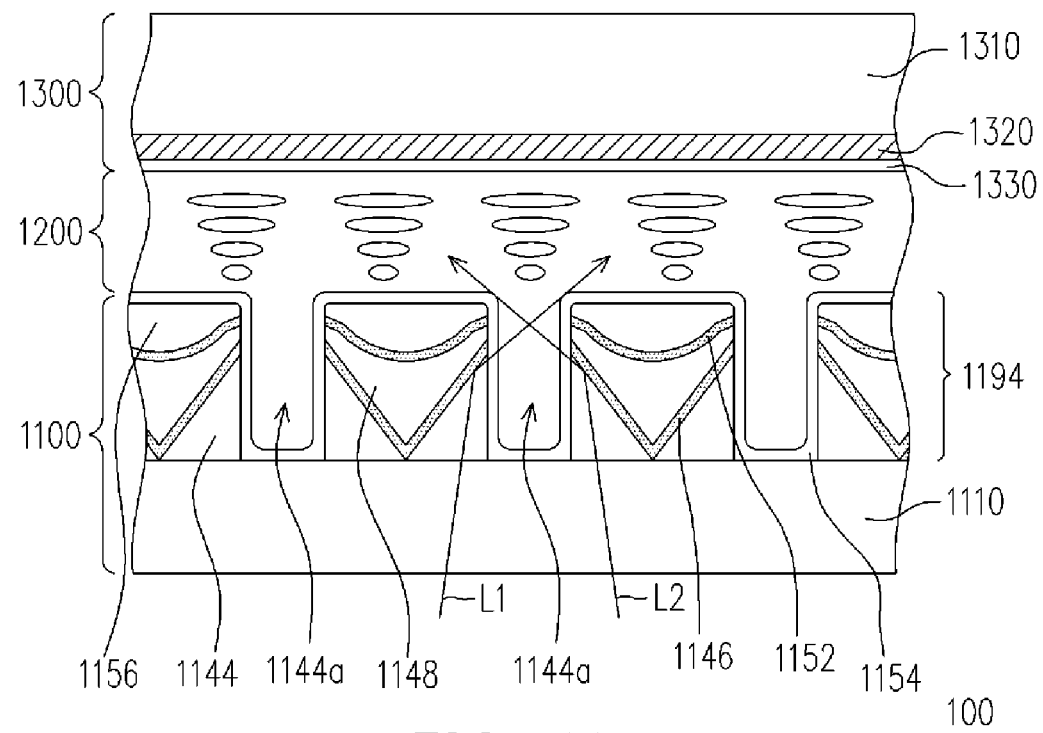
FIG. 1A is a sectional view of the transflective LCD panel according to an embodiment of the present invention.

In the following detailed description, for purposes of explanation, numerous specific details are set forth in order to provide a thorough understanding of the embodiments. It will be apparent, however, that the embodiments may be practiced without these specific details. In other instances, well-known structures and devices are schematically shown in order to simplify the drawing.

Figure 1B:
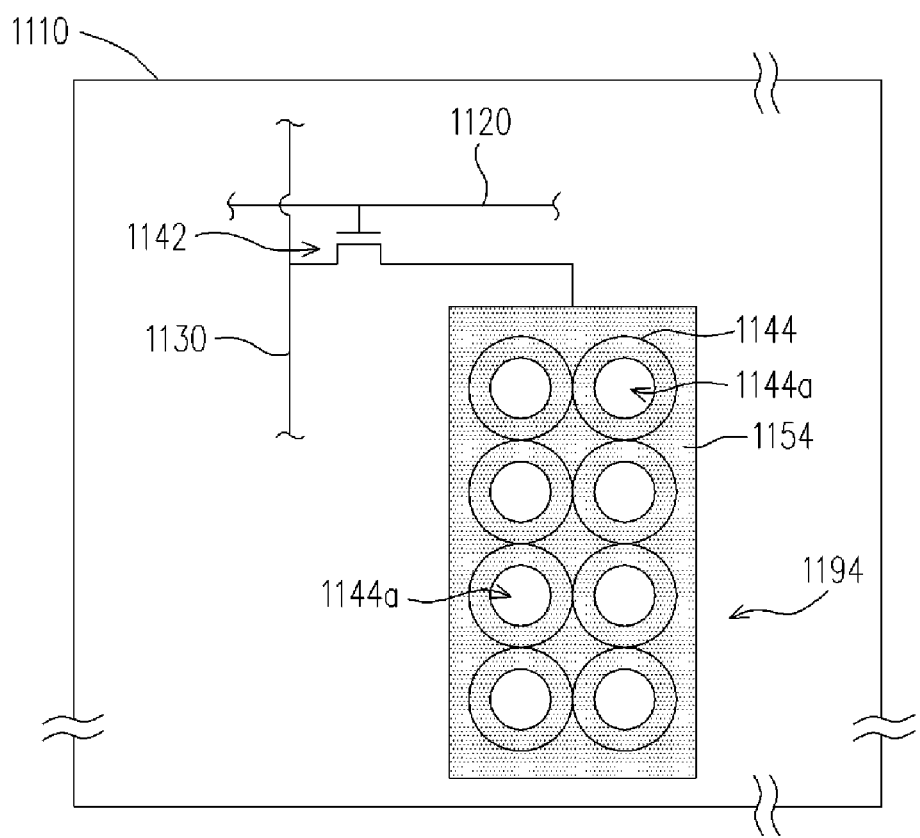
FIG. 1B is a schematic plan view of one pixel unit of FIG. 1A.

FIG. 1A is a sectional view of the transflective LCD panel according to an embodiment of the present invention. FIG. 1B is a schematic plan view of one pixel unit of FIG. 1A. Referring to both FIG. 1A and FIG. 1B, a transflective LCD panel 100 comprises an active device array substrate 1100, a counter substrate 1300, and a liquid crystal layer 1200, wherein the liquid crystal layer 1200 is disposed between the active device array substrate 1100 and the counter substrate 1300. Further, the counter substrate 1300 comprises a substrate 1310, a color filter film 1320 and a common electrode layer 1330, wherein the color filter film 1320 is disposed on the substrate 1310 and the common electrode layer 1330 is disposed on the color filter film 1320. In other words, in the present embodiment, the counter substrate 1300 is a color filter (CF) substrate, and the active device array substrate 1100 can be a thin film transistor (TFT) array substrate, diode array substrate, or an active device array substrate of other types.

It should be noted that, the transflective LCD panel 100 does not necessarily include liquid crystal layer 1200, but can also be a blank panel only comprising active device array substrate 1100 and counter substrate 1300. Further, the present invention is not limited to active-matrix transflective LCD panels, but can also be used in passive-matrix transflective LCD panels.

The active device array substrate 1100 comprises a substrate 1110, a plurality of scan lines 1120, a plurality of data lines 1130, and a plurality of pixel units, wherein the scan lines 1120, data lines 1130, and the pixel units are disposed on the substrate 1110. In particular, each of the pixel units comprises an active device 1142, and a reflective structure 1194 electrically connected to the active device 1142. The reflective structure 1194 has a plurality of holes 1144a (FIG. 1B) opening upwardly and extending from a lower surface of reflective structure 1194 at the top surface of substrate 1110 to an upper surface of the reflective structure 1194. Between holes 1144a, a first reflective layer 1146, a bumping layer 1148, a second reflective layer 1152, and a transparent conductive layer 1154 are provided. The active device 1142 is electrically connected to the corresponding scan line 1120 and data line 1130, as well as to the transparent conductive layer 1154 of the respective pixel unit. In addition, the active device 1142 can be a TFT, diode, or an active device of other types. The second reflective layer 1152 is arranged for reflecting light incident thereon from substrate 1300 back to substrate 1300 toward the viewer. The first reflective layer 1146 is arranged for reflecting light rays, such as L1, L2 in FIG. 1A, which are generated by a back light unit (not shown) disposed below substrate 1100 (FIG. 1A) upwardly toward substrate 1300, and hence toward the viewer.

Figure 2A:
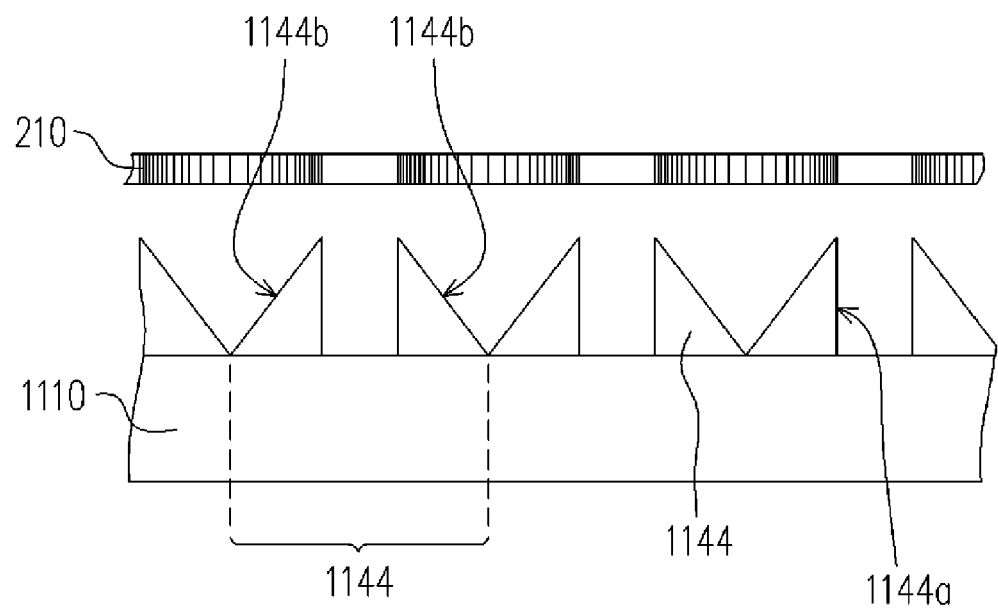
FIGS. 2A-2D are schematic sectional views showing a method of fabricating the active device array substrate according to an embodiment of the present invention.

Each through hole 1144a is formed within a protrusion 1144 (best seen in FIG. 2A). The protrusions 1144 of each pixel unit are disposed on the substrate 1110, preferably adjacent one another as best seen in FIG. 2A, and each of the protrusions 1144 has at least a through hole 1144a exposing a portion of the substrate 1110. The first reflective layer 1146 is conformally disposed on side walls 1144b of the protrusions 1144) but not in the through holes 1144a, as best seen in FIG. 2A. In particular, the protrusions 1144 can be cone frustums, pyramid frustums, or frustums of other forms. As seen in the sectional views of FIGS. 1A and 2A, the sidewalls 1144b of the protrusions 1144 are approximately straight. However, side walls 1144b are not necessarily planar and can have a curvature or facets depending on the frustum shape of the protrusions 1144. Moreover, the protrusions 1144, which are transparent, can be made of organic or any suitable materials, the refractive index thereof being preferably greater than or equal to that of the liquid crystal layer 1200. As such, the light (e.g., L1, L2) reflected by the first reflective layer 1146, upon entering the liquid crystal layer 1200, are not inappropriately refracted or reflected due to the different refractive indexes of the protrusions 1144 and the liquid crystal layer 1200, and thus can be successfully emitted from the surface of the counter substrate 1300.

The bumping layer 1148 is disposed on the first reflective layer 1146 but not in the through holes 1144a. The second reflective layer 1152 is conformally disposed on the bumping layer 1148 but not in the through holes 1144a. The transparent conductive layer 1154 is conformally disposed on the substrate 1110 and covers the portions of substrate 1110 that are exposed by the through holes 1144a. Moreover, the transparent conductive layer 1154 is electrically connected to the active device 1142.

Particularly, the bumping layer 1148 can be made of an organic material. The material of the first reflective layer 1146 and the second reflective layer 1152 can be aluminum, silver, or other metals with high reflectivity. Moreover, the material of the transparent conductive layer 1154 can be indium tin oxide (ITO), indium zinc oxide (IZO), aluminum zinc oxide (AZO), or other transparent conductive materials.

It should be noted that, part of the light emitted by the backlight source, the light L1, L2 that would otherwise be shielded by the second reflective layer 1152 in a conventional structure lacking the first reflective layer 1146, can be redirected into the through holes 1144a after being reflected off the first reflective layer 1146. In other words, the protrusions 1144 and the first reflective layer 1146 can form a light condensing structure, so as to enhance the light utilization of the backlight source. Compared with the conventional art that does not have such light condensing structure, the transflective liquid crystal panel 100 in accordance with the embodiments of the present invention has higher display brightness without requiring an increased luminance intensity of the backlight source.

Furthermore, in the present embodiment, a planarization layer 1156 can be disposed between the second reflective layer 1152 and the transparent conductive layer 1154. As can be seen in the sectional views of FIGS. 1A and 2A-2D adjacent protrusions 1144 are interconnected at their lower ends, and the first reflective layer 1146 on the adjacent protrusions 1144 can be interconnected to be a V shape in cross section, so as to fully or maximally reflect the light emitted by the backlight source.

The method of fabricating the active device array substrate 1100 will be described in detail below.

FIGS. 2A to 2D are schematic sectional views showing a method of fabricating the active device array substrate according to an embodiment of the present invention. First, a substrate 1110 is provided. Substrate 1110 has a plurality of scan lines 1120, a plurality of data lines 1130, and a plurality of active devices 1142 already formed thereon, wherein each of the active devices 1142 is electrically connected to the corresponding scan line 1120 and data line 1130 (as shown in FIG. 1B).

Then, a plurality of protrusions 1144 are formed on the substrate 1110, wherein each of the protrusions 1144 has at least a through hole 1144a exposing a portion of the substrate 1110, as best seen in FIG. 2A. For example, the method of forming the protrusions 1144 can comprise forming a material layer on the substrate 1110 by, e.g., spin-coating, and then, patterning the formed material layer by, e.g., using a mask, such as a half-tone mask 210, so as to simultaneously form the protrusions 1144 and the through holes 1144a, e.g., in the center of the protrusions 1144. The patterning process can include an exposure process and a development process. The through holes so formed preferably have vertical side walls that are perpendicular to the pane of substrate 1110.

Figure 2B:
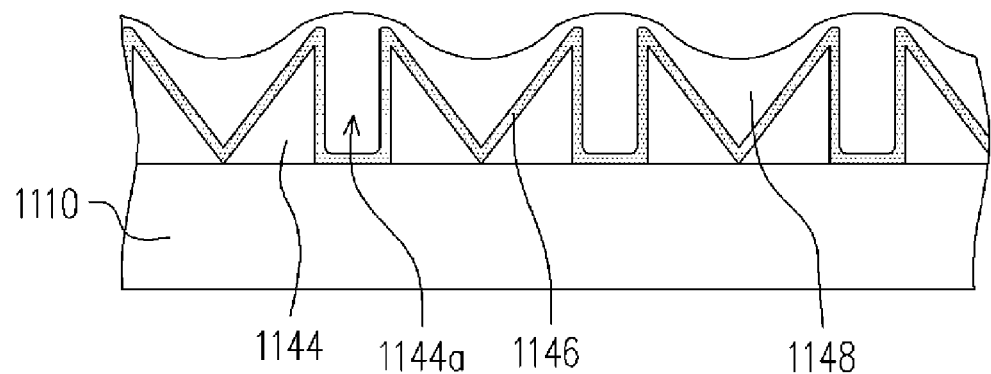

Thereafter, as can be seen in FIG. 2B, a first reflective layer 1146 is conformally formed on the substrate 1110 and covers the side walls 1144b of protrusions 1144, the side and bottom walls of holes 1144a. The process of forming the first reflective layer 1146 can include a sputtering process or other deposition processes.

Figure 2C:
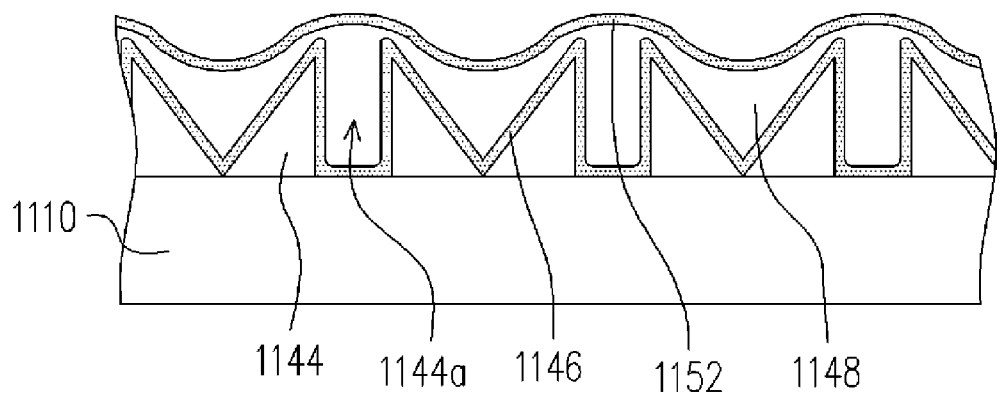

In the step of FIG. 2C, a bumping layer 1148 is conformally formed on the substrate 1110 and covers the first reflective layer 1146, wherein the method of forming the bumping layer 1148 can be a spin-coating process. Then, a second reflective layer 1152 is conformally formed on the bumping layer 1148, wherein the method of forming the second reflective layer 1152 can be a sputtering process or other deposition processes.

Figure 2D:
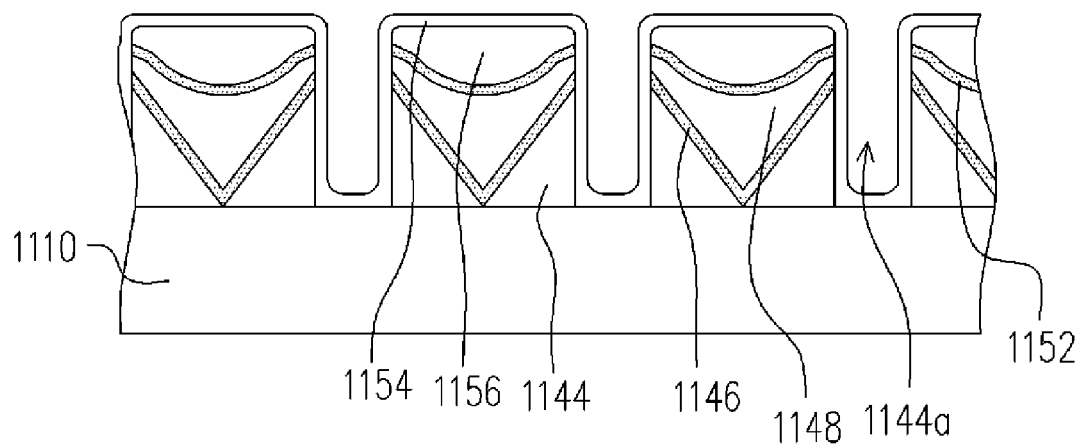

In the step of FIG. 2D, the structure obtained after the step of FIG. 2C is selectively patterned, so as to remove the portions of the second reflective layer 1152, the bumping layer 1148, and the first reflective layer 1146 to expose the substrate 1110 at the bottom of the through holes 1144a. The patterning process can be a lithographic process and an etching process. Thereafter, a transparent conductive layer 1154 is conformally formed on the substrate 1110 so as to cover (1) the upper surface and the exposed side walls of second reflective layer 1152, bumping layer 1148, and first reflective layer 1146, as well as (2) the side and bottom walls of holes 1144a. The method of forming the transparent conductive layer 1154 can be a sputtering process and other deposition processes. Thus, the active device array substrate 1100 is substantially fabricated.

It should be noted that, after the second reflective layer 1152 is formed, a planarization layer 1156 can be formed on the substrate 1110. Then, in the patterning process, the planarization layer 1156 above the through holes 1144a is removed together with second reflective layer 1152, the bumping layer 1148, and the first reflective layer 1146.

In view of the above description, the transflective LCD panel and the method of fabricating the active device array substrate in accordance with the embodiments of the present invention have at least the following advantages.

1. Compared with the conventional art, the transflective LCD panel of the embodiments of the present invention has higher brightness and better display quality.

2. Compared with the conventional art, the transflective LCD panel of the embodiments of the present invention has better light utilization of the backlight source.

3. The method of fabricating the active device array substrate of the embodiments of the present invention is compatible with the current processes and thus additionally processing equipments are not required.

The transflective LCD panel of the embodiments of the present invention can be used in various electronic devices, so as to form transflective LCD apparatuses, such as mobile phones, PDAs, pocket PCs, or other electronic devices with display screens.

While the present invention has been illustrated by the description of the embodiments thereof, and while the embodiments have been described in considerable detail, it is not the intention of the applicant to restrict or in any way limit the scope of the appended claims to such detail. Additional advantages and modifications could be made herein without departing from the scope of the described embodiments as defined by the appended claims. Furthermore, although elements of the described embodiments may be described or claimed in the singular, the plural is contemplated unless limitation to the singular is explicitly stated.

What is claimed is:

1. A transflective liquid crystal display (LCD) panel, comprising:
   a first substrate, having a plurality of pixel units, wherein each of the pixel units comprises:
      a plurality of protrusions disposed over the first substrate, wherein each of the protrusions has at least a through hole exposing a portion of the first substrate;
      a first reflective layer, disposed on outer walls of the protrusions but not on the exposed portions of the first substrate;
      a bumping layer, disposed above the first reflective layer;
      a second reflective layer, disposed above the bumping layer;
      a transparent conductive layer, covering the portions of the first substrate exposed by the through holes; and
   a second substrate above the first substrate.

2. The transflective LCD panel as claimed in claim 1, wherein the first substrate further comprises a plurality of scan lines and a plurality of data lines, and each of the pixel units is electrically connected to the corresponding scan line and the data line.

3. The transflective LCD panel as claimed in claim 2, wherein each of the pixel units further comprises an active device electrically connected to the corresponding scan line and the data line, the transparent conductive layer is electrically connected to the active device, and the second substrate has a common electrode layer.

4. The transflective LCD panel as claimed in claim 1, wherein each of the pixel unit further comprises a planarization layer disposed between the second reflective layer and the transparent conductive layer.

5. The transflective LCD panel as claimed in claim 1, wherein the protrusions are frustums.

6. The transflective LCD panel as claimed in claim 1, wherein two adjacent protrusions are interconnected by at least said bumping layer and said second reflective layer.

7. The transflective LCD panel as claimed in claim 1, wherein the refractive index of the protrusions is the substantially same as that of a liquid crystal material to be used with said panel.

8. The transflective LCD panel as claimed in claim 1, wherein at least one of the protrusions and the bumping layer comprises an organic material.

9. The transflective LCD panel as claimed in claim 1, wherein the transparent conductive layer is electrically connected to the second reflective layer.

10. The transflective LCD panel as claimed in claim 1, wherein the transparent conductive layer covers the second reflective layer.

11. A method of fabricating a transflective liquid crystal display (LCD) panel, using a first substrate having a plurality of scan lines, a plurality of data lines, and a plurality of active devices formed thereon, wherein each of the active devices is electrically connected to the corresponding scan line and the data line, said method comprising:
   forming a plurality of protrusions on the first substrate, wherein each of the protrusions has a through hole exposing a portion of the first substrate;
   forming a first reflective layer on at least the protrusions;
   forming a bumping layer on the first reflective layer;
   forming a second reflective layer on the bumping layer;
   selectively and partially removing at least one of the second reflective layer, the bumping layer, and the first reflective layer, so as to expose the portions of the first substrate exposed by the through holes; and forming a transparent conductive layer on the first substrate.

12. The method of claim 11, further comprising
assembling a second substrate having a common electrode layer with the first substrate, wherein the common electrode layer of the second substrate faces the pixel units of the first substrate.

13. The method of claim 12, wherein the process of forming the protrusions comprises:
forming a material layer on the first substrate; and
patterning the material layer by a half-tone mask to form the protrusions and the through holes simultaneously.

14. The method of claim 12, wherein after the second reflective layer is formed, a planarization layer is further formed on the second reflective layer and is selectively and partially removed in the selectively and partially removing step.

15. The method of claim 11, wherein the transparent conductive layer is formed on the first substrate so as to cover the exposed portions of the first substrate.

16. The method of claim 15, wherein the transparent conductive layer is formed on the first substrate so as to be electrically connected to and cover the second reflective layer.

17. A transflective liquid crystal display (LCD) apparatus, comprising:
a first substrate, having a plurality of pixel units, wherein each of the pixel units comprises:
a plurality of protrusions disposed over the first substrate, wherein each of the protrusions has at least a through hole exposing a portion of the first substrate;
a first reflective layer, disposed on outer walls of the protrusions but not on the exposed portions of the first substrate;
a bumping layer, disposed above top the first reflective layer;
a second reflective layer, disposed above top the bumping layer;
a transparent conductive layer, covering the portions of the first substrate exposed by the through holes;
a second substrate above and facing the first substrate; and
a liquid crystal layer, disposed between the first substrate and the second substrate.

18. The transflective LCD apparatus as claimed in claim 17, wherein the first substrate further comprises a plurality of scan lines and a plurality of data lines, and each of the pixel units is electrically connected to the corresponding scan line and the data line.

19. The transflective LCD apparatus as claimed in claim 18, wherein each of the pixel units further comprises an active device electrically connected to the corresponding scan line and the data line, the transparent conductive layer is electrically connected to the active device, and the second substrate has a common electrode layer.

20. The transflective LCD apparatus as claimed in claim 17, wherein each of the pixel units further comprises a planarization layer disposed between the second reflective layer and the transparent conductive layer.

21. The transflective LCD apparatus as claimed in claim 17, wherein the protrusions are frustums.

22. The transflective LCD apparatus as claimed in claim 17, wherein two adjacent protrusions are interconnected by at least said bumping layer and said second reflective layer.

23. The transflective LCD apparatus as claimed in claim 17, wherein the refractive index of the protrusions is the substantially same as that of the liquid crystal layer.

24. A portable electronic device, comprising a display screen being the transflective LCD apparatus as claimed in claim 17.

25. The portable electronic device as claimed in claim 24, wherein the portable electronic device is selected from the group consisting of a mobile phone, a personal digital assistant, or a pocket PC.

26. The transflective LCD apparatus as claimed in claim 17, wherein the transparent conductive layer is electrically connected to the second reflective layer.

27. The transflective LCD apparatus as claimed in claim 17, wherein the transparent conductive layer covers the second reflective layer.

* * * * *